US012706559B2

(12) United States Patent
Henry et al.

(10) Patent No.: US 12,706,559 B2
(45) Date of Patent: Aug. 11, 2026

(54) HIGH-TEMPERATURE CERAMIC COMBUSTOR WITH THERMOPHOTOVOLTAIC POWER GENERATION

(71) Applicant: Massachusetts Institute of Technology, Cambridge, MA (US)

(72) Inventors: Asegun S. Henry, Cambridge, MA (US); Alina Lapotin, Cambridge, MA (US); Shomik Verma, Cambridge, MA (US); Colin Clancy Kelsall, Cambridge, MA (US); Kyle Joseph Buznitsky, Cambridge, MA (US); Mehdi Pishahang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/855,540

(22) PCT Filed: Feb. 13, 2023

(86) PCT No.: PCT/US2023/062473
§ 371 (c)(1),
(2) Date: Oct. 9, 2024

(87) PCT Pub. No.: WO2023/201132
PCT Pub. Date: Oct. 19, 2023

(65) Prior Publication Data

US 2025/0330111 A1 Oct. 23, 2025

Related U.S. Application Data

(60) Provisional application No. 63/330,410, filed on Apr. 13, 2022.

(51) Int. Cl.
*H02S 10/30* (2014.01)
*F23R 3/04* (2006.01)
*F23R 3/28* (2006.01)

(52) U.S. Cl.
CPC ................ *H02S 10/30* (2014.12); *F23R 3/04* (2013.01); *F23R 3/28* (2013.01)

(58) Field of Classification Search
CPC .... H02S 10/30; F23R 3/04; F23R 3/28; F23D 14/66; F23D 99/004; F23L 15/04; F23C 2900/9901
See application file for complete search history.

(56) References Cited

U.S. PATENT DOCUMENTS 4,850,862 A * 7/1989 Bjerklie .................. F23D 14/16 431/170
5,356,487 A * 10/1994 Goldstein .............. F23N 5/082 431/103

(Continued)

FOREIGN PATENT DOCUMENTS

WO WO-2023/201132 A1 10/2023

OTHER PUBLICATIONS

Uwe Scheithauer "Additive Manufacturing of Ceramic Heat Exchanger: Opportunities and Limits of the Lithography-Based Ceramic Manufacturing (LCM)" JMEPEG (2018) 27:14-20 (Year: 2018).*

(Continued)

*Primary Examiner* — Michael Y Sun
(74) *Attorney, Agent, or Firm* — Foley Hoag LLP; Dana M. Gordon; Tesia V. Chciuk

(57) ABSTRACT

A device for electricity generation can include a combustor/recuperator system comprising a recuperator, a combustor, and an emitter; wherein the recuperator comprises an intake for air and fuel, wherein the combustor burns fuels, transfers exhaust gases to the recuperator to preheat the air and fuel, (Continued)

and transfers heat of combustion to the emitter; and wherein the emitter radiates heat generated by the combustor; and a combustion thermophotovoltaic (c-TPV) array comprising a means of absorbing incident radiation from the emitter.

15 Claims, 18 Drawing Sheets

(56) References Cited

U.S. PATENT DOCUMENTS

| | | | | |
|---|---|---|---|---|
| 5,932,885 | A * | 8/1999 | DeBellis | F23C 3/002 250/493.1 |
| 2002/0172838 | A1 | 11/2002 | Rigney et al. | |
| 2011/0284059 | A1 | 11/2011 | Celanovic et al. | |
| 2022/0051825 | A1* | 2/2022 | Botha | G21C 15/18 |
| 2022/0172838 | A1* | 6/2022 | Besanson | G16H 50/20 |

OTHER PUBLICATIONS

International Search Report and Written Opinion for International Application No. PCT/US23/62473 dated Aug. 2, 2023.
LaPotin et al., “Thermophotovoltaic efficiency of 40%.” Nature 604 (7905) (2022): 287-291.
Scheithauer et al. “Additive manufacturing of ceramic heat exchanger: opportunities and limits of the lithography-based ceramic manufacturing (LCM).” Journal of Materials Engineering and Performance 27 (Jan. 1, 2018): 14-20.

* cited by examiner

HIGH-TEMPERATURE CERAMIC COMBUSTOR WITH THERMOPHOTOVOLTAIC POWER GENERATION

CLAIM OF PRIORITY

This application is a U.S. § 371 National Stage of International Application No. PCT/US23/62473, filed Feb. 13, 2023; which claims the benefit of priority to U.S. Provisional Patent Application No. 63/330,410, filed Apr. 13, 2022; each of which is incorporated herein by reference in its entirety.

FIELD OF THE INVENTION

The invention relates to devices and methods for thermophotovoltaic power generation.

BACKGROUND

Thermophotovoltaic energy conversion can convert heat to electricity. Thermophotovoltaic energy systems can have relatively low efficiency.

SUMMARY

This Summary introduces a selection of concepts in simplified form that are described further below in the Detailed Description. This Summary neither identifies key or essential features, nor limits the scope, of the claimed subject matter.

In one aspect, a device for electricity generation can include a combustor/recuperator system comprising a recuperator, a combustor, and an emitter; wherein the recuperator comprises an intake for air and fuel for transfer to the combustor, wherein the combustor burns fuels, transfers exhaust gas to the recuperator to preheat the air and fuel, and transfers heat of combustion to the emitter; and wherein the emitter radiates heat generated by the combustor; and a thermophotovoltaic adjacent to the emitter.

In another aspect, a device for electricity generation can include a fuel inlet and fuel passage, an air inlet and air passage, a combination zone after the fuel passage and air passage, a recuperator including an exhaust gas passage in thermal communication with the fuel passage and the air passage, a combustor adjacent to the combination zone including an emitter, and a thermophotovoltaic adjacent to the emitter.

In another aspect, a method of generating electricity can include preheating air and fuel by passing the air and the fuel through a recuperator, combining the fuel and the air in a combustor to generate heat and exhaust gas, transferring the exhaust gases to the recuperator to preheat the air and fuel, and emitting the generated heat to a thermophotovoltaic to generate electricity.

In certain circumstances, the thermophotovoltaic includes a combustion thermophotovoltaic array.

In certain circumstances, the recuperator can include a plurality of modules. Each module can include, independently, an air channel, a fuel channel and a combustor region at a junction of the air channel and the fuel channel, and an emitter oriented toward the thermophotovoltaic.

In certain circumstances, the plurality of modules can form a stacked array.

In certain circumstances, the fuel includes $H_2$ or $CH_4$.

In certain circumstances, the combustor/recuperator system includes a stacked array of individual combustor/recuperator modules, wherein top, bottom, and side boundaries of each individual combustor/recuperator module is adiabatic.

In certain circumstances, the stacked array can include an emitter surface that emits heat towards the TPV array.

In certain circumstances, the combustor/recuperator system includes yttria-stabilized zirconia (YSZ). The recuperator can include yttria-stabilized zirconia. The combustor can include yttria-stabilized zirconia.

In certain circumstances, the combustor comprises channels made by additive manufacturing. In certain embodiments, the channels of the combustor comprise ceramic.

In certain circumstances, the recuperator portion of the combustor/recuperator system is made by additive manufacturing.

In certain circumstances, the fuel and air can enter the recuperator at ambient temperature.

In certain circumstances, the combustor portion of the combustor/recuperator system comprises a fuel inlet and an air inlet.

In certain circumstances, the fuel and air inlets are above the autoignition temperature of the fuel.

In certain circumstances, the preheated fuel can be above the autoignition temperature of the fuel when combined with the preheated air. For example, the fuel can be preheated to 2000° C. or greater by exhaust gas.

In certain circumstances, the fuel passage is a ceramic channel.

In certain circumstances, the fuel passage and the air passage is a ceramic channel.

In certain circumstances, ambient air enters the recuperator at 300K and are preheated to 2000° C. or greater by exiting exhaust gas.

In certain circumstances, at the end of the recuperator the air exits at 2000° C. or greater, mixes with fuel, and combusts in the combustion chamber.

In certain circumstances, the generated heat can pass through an emitter to the thermophotovoltaic.

In certain circumstances, combustion in the combustor raises the temperature of the exhaust gas to greater than 2000° C. and transfers heat via convection to the walls of the emitter.

In certain circumstances, the exterior temperature of the emitter radiating to the thermophotovoltaic varies from about 1900° C. to about 1700° C. across its length. In certain circumstances, a portion of the heat of combustion is transferred from the combustor to the emitter to radiate to the thermophotovoltaic and heat reflected by the thermophotovoltaic is recuperated.

In certain circumstances, the thermophotovoltaic absorbs the incident radiation produced by the emitter as heat, as electricity, or reflects the incident radiation back to the emitter.

The following Detailed Description references the accompanying drawings which form a part this application, and which show, by way of illustration, specific example implementations. Other implementations may be made without departing from the scope of the disclosure.

BRIEF DESCRIPTION OF THE DRAWINGS

FIG. 6A shows the full distribution while FIG. 6B shows the fraction of powers after subtracting reflection and radiative recombination, to show calculated efficiency (peak of 63% at 1.4 eV).

DETAILED DESCRIPTION

Figure 1:
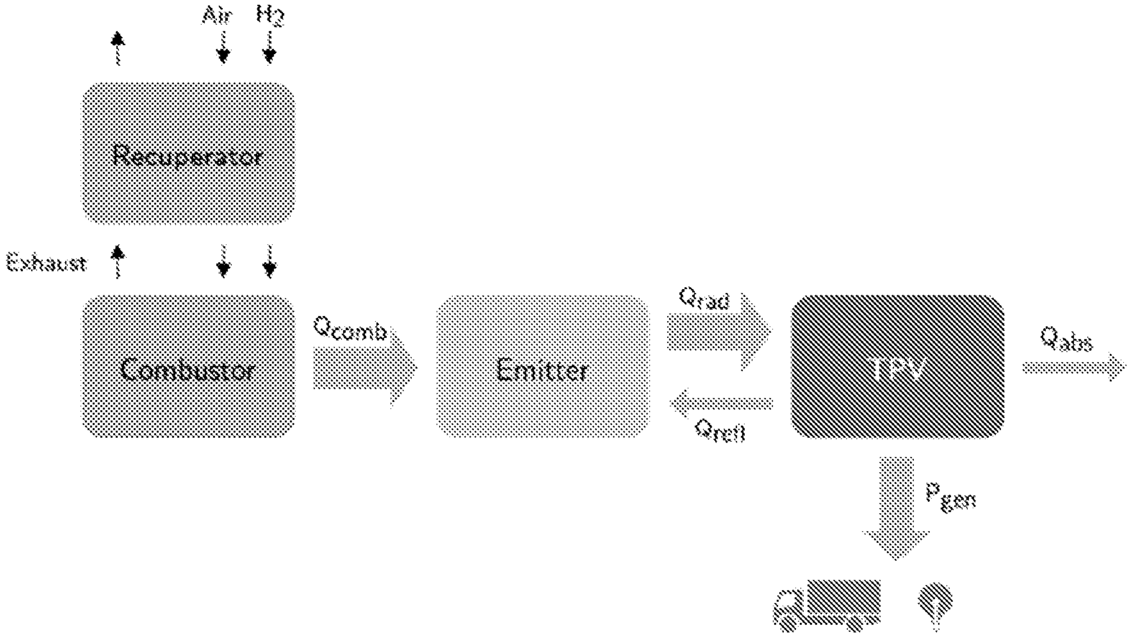
FIG. 1 shows a process diagram of the combustion-TPV (c-TPV) concept. Air and fuel are preheated in the recuperator by the exhaust gas from the combustor, improving its efficiency. The heat of combustion is transferred to the emitter which radiates light towards the TPV cell. Sub-bandgap light is reflected from the TPV back to the emitter. Above-bandgap light is either absorbed as heat or converted to electricity.

A power generation device using a ceramic combustor and recuperator features a thermophotovoltaic (TPV) module facing a high-temperature combustion-fueled heat source. As shown recently, TPV cells can achieve 40% heat-to-electricity efficiency using tandem architectures, a back-reflector, and high emitter temperatures of >2000° C. (Ref. 1) Greater than 50% conversion efficiency is feasible with future cell improvements. (Refs. 2-5) There are many potential applications for TPV. Disclosed herein is a combustion-TPV (c-TPV) device for electricity production. The technology is targeted to use hydrogen fuel as a replacement for conventional hydrogen fuel cells for decarbonized electricity generation, but other fuels such as $CH_4$ can also be used. The technology proposed here would have efficiencies comparable to or greater than electricity production from turbines, but with a number of advantages including lower cost per power (<$0.25/W), (Refs. 6 and 7) faster response times, lower maintenance, fuel flexibility, solid-state conversion, modularity, and flexibility to operate at higher temperatures than turbines for greater efficiency gains. Previous c-TPV designs either operate at low temperatures or exhibit low efficiencies. The high-temperature, all-ceramic design disclosed herein allows both high efficiency and power density.

A device for electricity generation can include a combustor/recuperator system comprising a recuperator, a combustor, and an emitter; wherein the recuperator comprises an intake for air and fuel for transfer to the combustor, wherein the combustor burns fuels, transfers exhaust gas to the recuperator to preheat the air and fuel, and transfers heat of combustion to the emitter; and wherein the emitter radiates heat generated by the combustor; and a thermophotovoltaic adjacent to the emitter.

The device can be made from a ceramic material. For example, each of the fuel passage and the air passage, independently, can be a ceramic channel. The combustor can be a ceramic material. In certain embodiments, each component of the device can be a ceramic material. In preferred embodiments, the ceramic material can be a zirconia, for example, a yttria-stabilized zirconia. The yttria-stabilized zirconia can include about 3% yttrium.

The device, or components of the device, can be manufactured by additive manufacturing. Additive manufacturing can assemble the ceramic portions of the device.

The thermophotovoltaic can include a semiconductor, for example, gallium antimonide or germanium. When the thermophotovoltaic is adjacent to the emitter, the thermophotovoltaic is positioned or otherwise configured to absorb incident radiation from the emitter. A portion of the heat of combustion can be transferred from the combustor to the emitter to radiate to the thermophotovoltaic and heat reflected by the thermophotovoltaic is recuperated. For example, the thermophotovoltaic can absorb incident radiation produced by the emitter as heat, as electricity, or reflects the incident radiation back to the emitter.

The emitter can be a metal, for example, an inert metal such as gold.

The fuel can include methane or hydrogen gas.

The air can be atmospheric gas including about 20% oxygen and 80% nitrogen. Alternatively, as used herein, air can include other mixtures of oxygen or oxidizing agents with an inert gas, such as oxygen/nitrogen mixtures of up to 30%, 40%, 50% or more oxygen (oxygen enriched air). The inert gas can include argon or helium.

A method of generating electricity can include preheating air and fuel by passing the air and the fuel through a recuperator. The after the recuperator preheats the fuel and/or air, the fuel and the air can be combined in a combustor to generate heat and exhaust gas. Exhaust gases can be transferred to the recuperator to preheat the air and fuel. The generated heat can be emitted to a thermophotovoltaic to generate electricity. The combination of recuperator and combustor unexpectedly improves the efficiency of the device to produce electricity.

The fuel and air can enter the recuperator at ambient temperature. In certain circumstances, the fuel and air inlets are above the autoignition temperature of the fuel. The preheated fuel can be above the autoignition temperature of the fuel when combined with the preheated air. For example, the fuel can be preheated to 2000° C. or greater by exhaust gas.

In certain circumstances, ambient air enters the recuperator at 300K and are preheated to 2000° C. or greater by exiting exhaust gas. In certain circumstances, at the end of the recuperator the air exits at 2000° C. or greater, mixes with fuel, and combusts in the combustion chamber. In certain circumstances, combustion in the combustor raises the temperature of the exhaust gas to greater than 2000° C. and transfers heat via convection to the walls of the emitter. In certain circumstances, the exterior temperature of the emitter radiating to the thermophotovoltaic varies from about 1900° C. to about 1700° C. across its length.

In certain circumstances, the recuperator can include a plurality of modules. Each module can include, independently, an air channel, a fuel channel and a combustor region at a junction of the air channel and the fuel channel, and an emitter oriented toward the thermophotovoltaic.

The plurality of modules can form a stacked array. In certain circumstances, the thermophotovoltaic includes a combustion thermophotovoltaic array. In certain circumstances, the combustor/recuperator system includes a stacked array of individual combustor/recuperator modules, wherein top, bottom, and side boundaries of each individual combustor/recuperator module is adiabatic.

In certain circumstances, the stacked array can include an emitter surface that emits heat towards the TPV array. The generated heat can pass through an emitter to the thermophotovoltaic.

Examples of the device, device designs, methods and modelling of conditions are shows in FIGS. 1-13.

Figure 13:
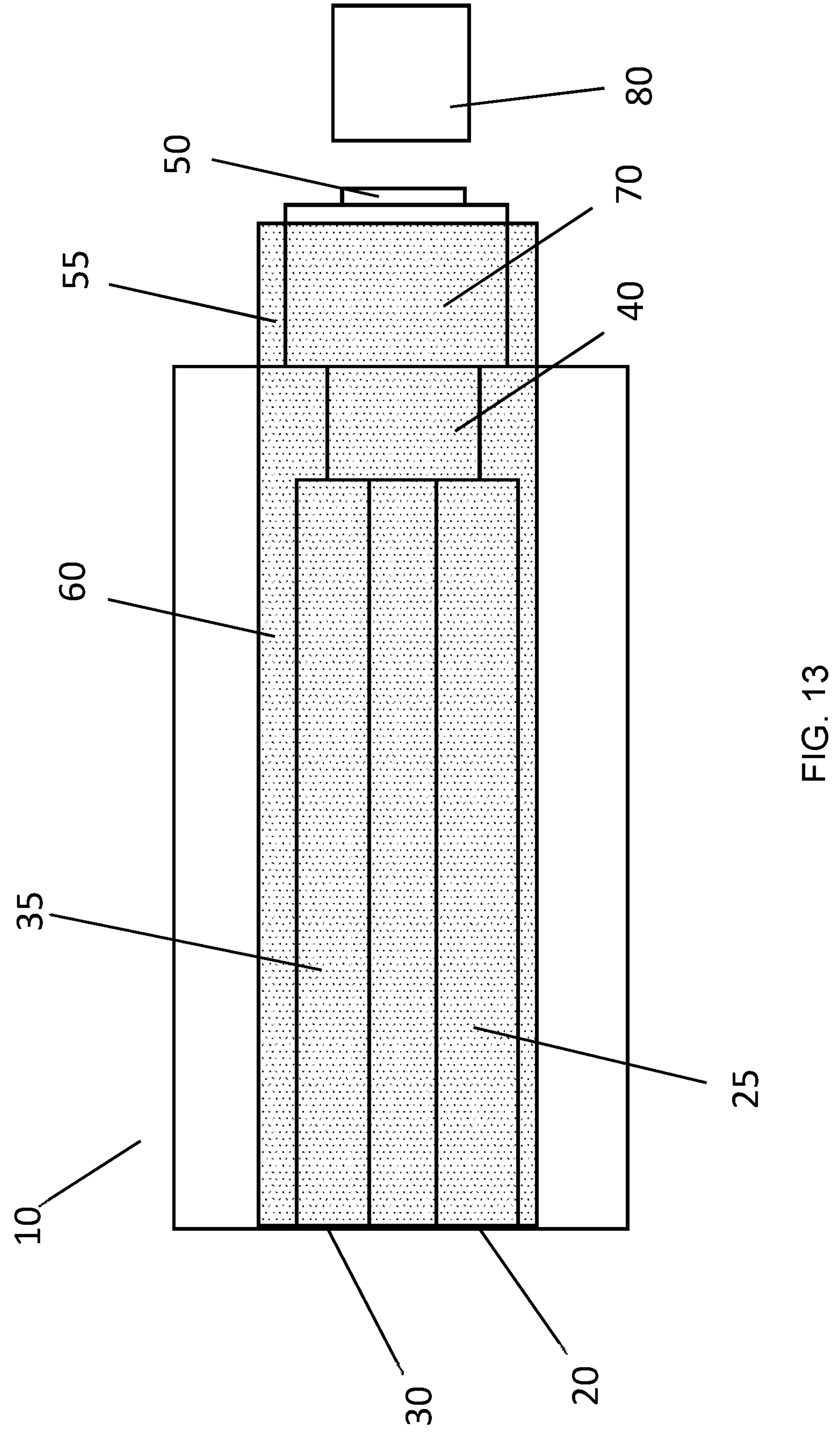
FIG. 13 is a schematic drawing of a device for electricity generation.

Referring to FIG. 13, device for electricity generation 10 can include a fuel inlet 20 and fuel passage 25, an air inlet 30 and air passage 35, and a combination zone 40 after the fuel passage and air passage. Recuperator 55 can include an exhaust gas passage 60 (dotted indicating recuperator 55 and exhaust gas passage 60 are behind the plane) in thermal communication with fuel passage 25 and air passage 35. Combustor 70 can be adjacent to the combination zone 40 and include an emitter 50. Thermophotovoltaic 80 can be adjacent to the emitter 50. The thermal communication creates a heat transfer region. The heat transfer region increases the temperature of the fuel and the air by fluid flow of the air or fuel in proximity to the exhaust gas carrying heat away from the combustor, which can improve the combustion efficiency of the device. The fuel or air, or both, can be preheated to or above the autoignition temperature of the fuel.

A schematic of the c-TPV concept is shown in FIG. 1. Air and hydrogen are first preheated and then sent to the combustor where they are mixed. The exhaust gases from the combustor (water vapor, $N_2$, etc) are sent back to the recuperator to preheat the air and fuel inlet, improving the efficiency of combustion. The combustion products then transfer heat to the emitter, which radiates heat towards the TPV array where it is converted to electricity. Of all the incident radiation on the TPV array, power can either be absorbed as heat (and extracted with cooling water), absorbed as electricity, or reflected as heat back to the emitter. The generated electricity can then be utilized for transportation, household use, etc.

Figure 2:
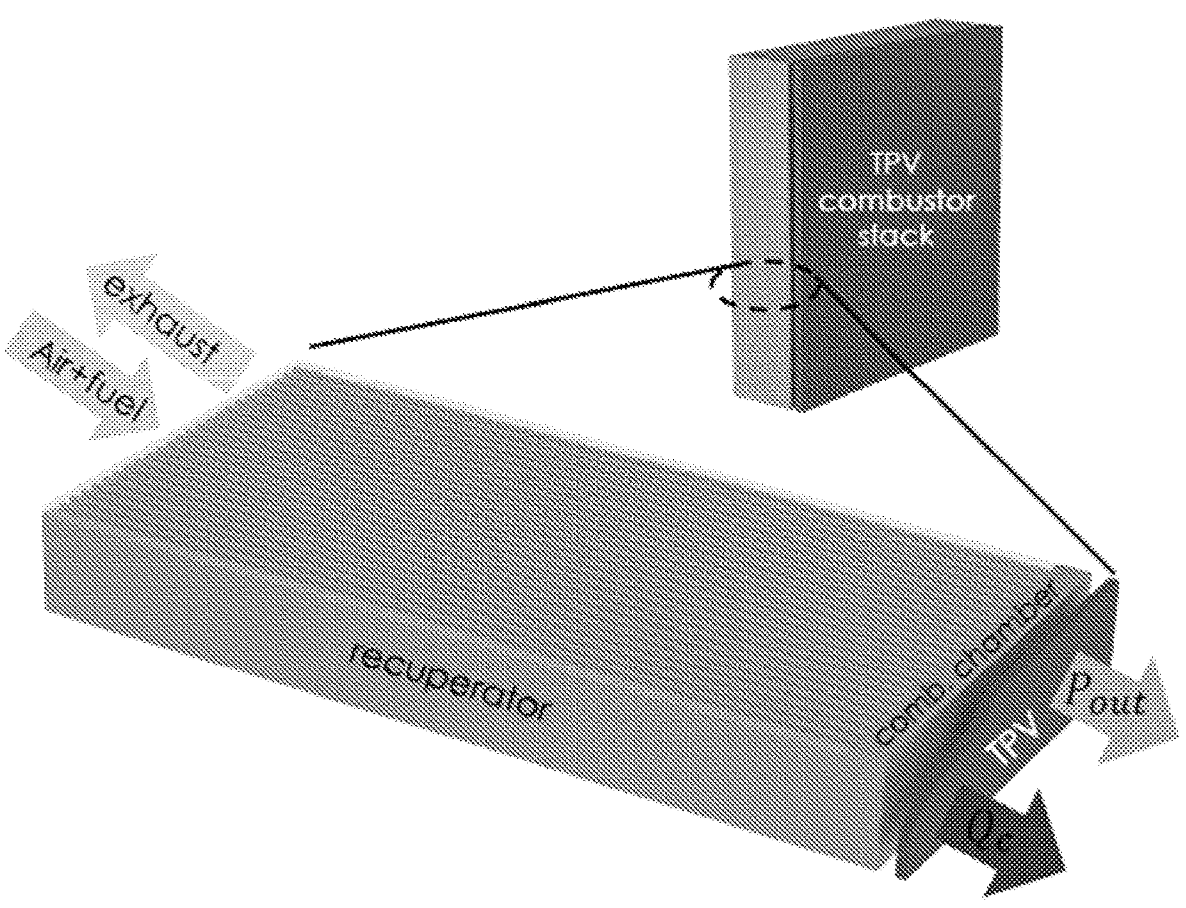
FIG. 2 shows a schematic of the combustor and recuperator. Air and fuel enter the recuperator and are preheated by the outgoing exhaust. The preheated air and fuel are mixed in the combustion chamber and the heat from combustion is emitted by the combustion chamber wall to the TPV cells. Exhaust gas then exits the combustion chamber to the recuperator for heat exchange. Individual modules of length scale on the order of ~5 cm can be stacked in an array to minimize edge heat losses from the system.

A practical implementation of the combustion-TPV system is shown in FIG. 2. The system is composed of individual combustor/recuperator modules. If one were to make a large, stacked array with such modules, the top, bottom, and side boundaries of each module would become adiabatic by symmetry. This would prevent heat leakage, and only the outermost units would need to be insulated from the environment. An array of these modules could be stacked together creating an emitter surface (defined by the exterior combustion chamber wall), which emits towards a panel of TPV cells. The panel of TPV cells is close and opposite the emitter array such that it has an area to perimeter ratio that is large and minimizes view-factor losses from the edges.

Figure 3:
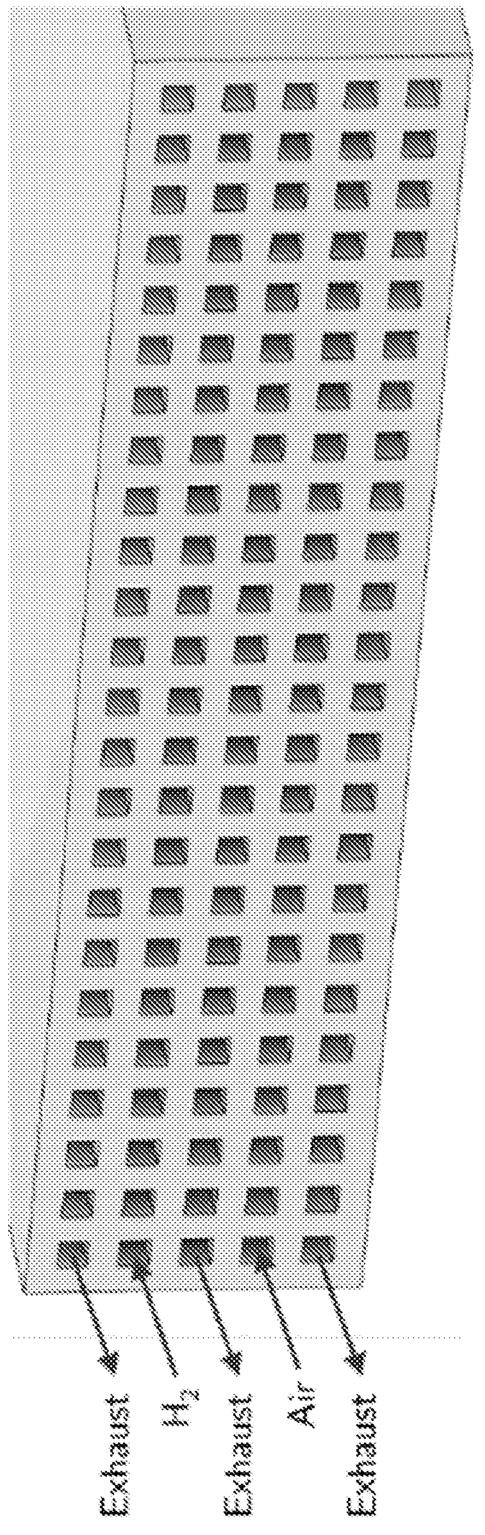
FIG. 3 is Design of recuperation section with air and fuel inlet and exhaust outlet. Exhaust is used to preheat the air and fuel to improve combustion-side efficiency. The channels are 1 mm×1 mm to improve convective heat transfer. The entire recuperator would be 5 cm wide and 1 cm tall, with a 12 cm length to ensure sufficient heat exchange.
Figure 4:
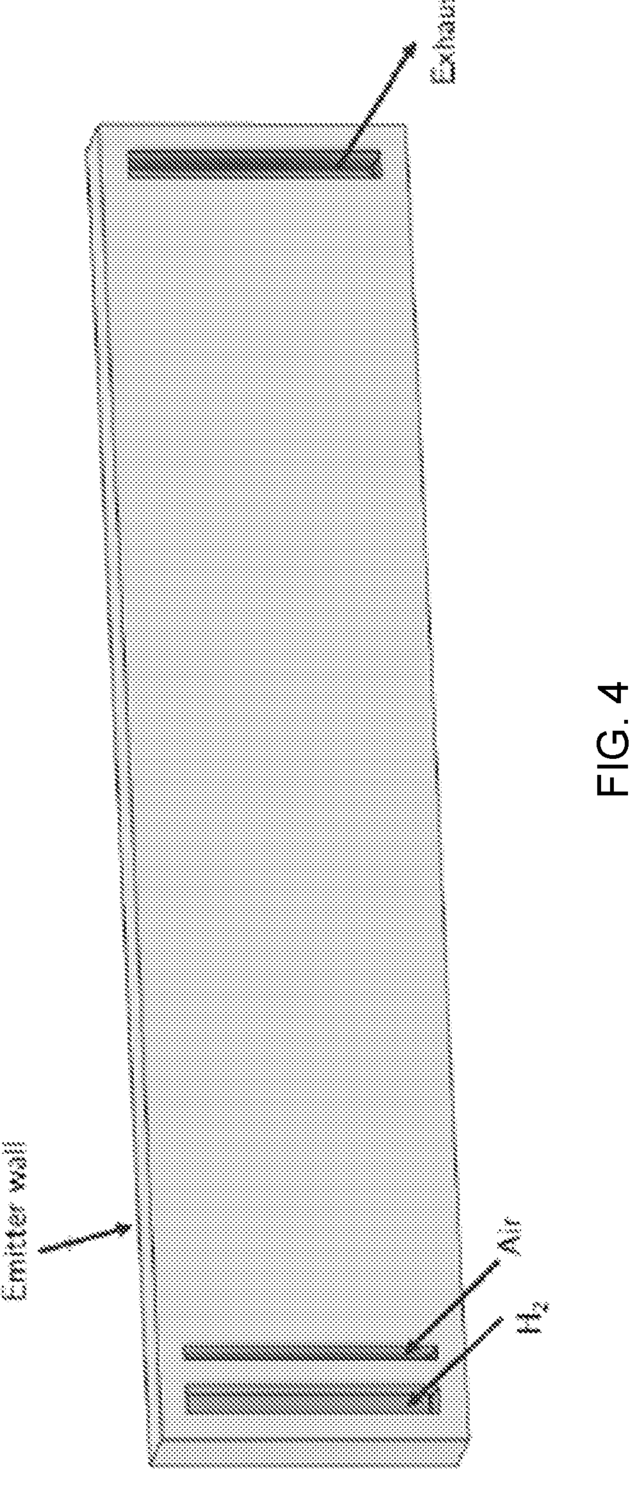
FIG. 4 is a design of combustion section with air and fuel inlet and exhaust outlet. Air-fuel combustion occurs and heat is transferred to the emitter wall which faces the TPV cells. Exhaust outlet is collected and sent to the recuperator to utilize remaining heat.

In concept this entire combustor/recuperator system could be made from yttria-stabilized zirconia (YSZ), with channels formed with additive manufacturing. (Ref. 8) Stoichiometric combustion of hydrogen in air has a max temperature of around 2100° C., which is why YSZ can be a preferred material. The recuperator portion of the system could be made as a printed circuit heat exchanger, (Ref. 9) as seen in FIG. 3. The combustor portion features fuel and air inlets, which automatically ignite the fuel in air upon contact as they are preheated to above the autoignition temperature of the fuel. Much of the heat of combustion is transferred to the wall and emitted to the TPV array, while the remainder of the heat is recuperated. FIG. 4.

Combustion Calculations and Modeling

Figure 5:
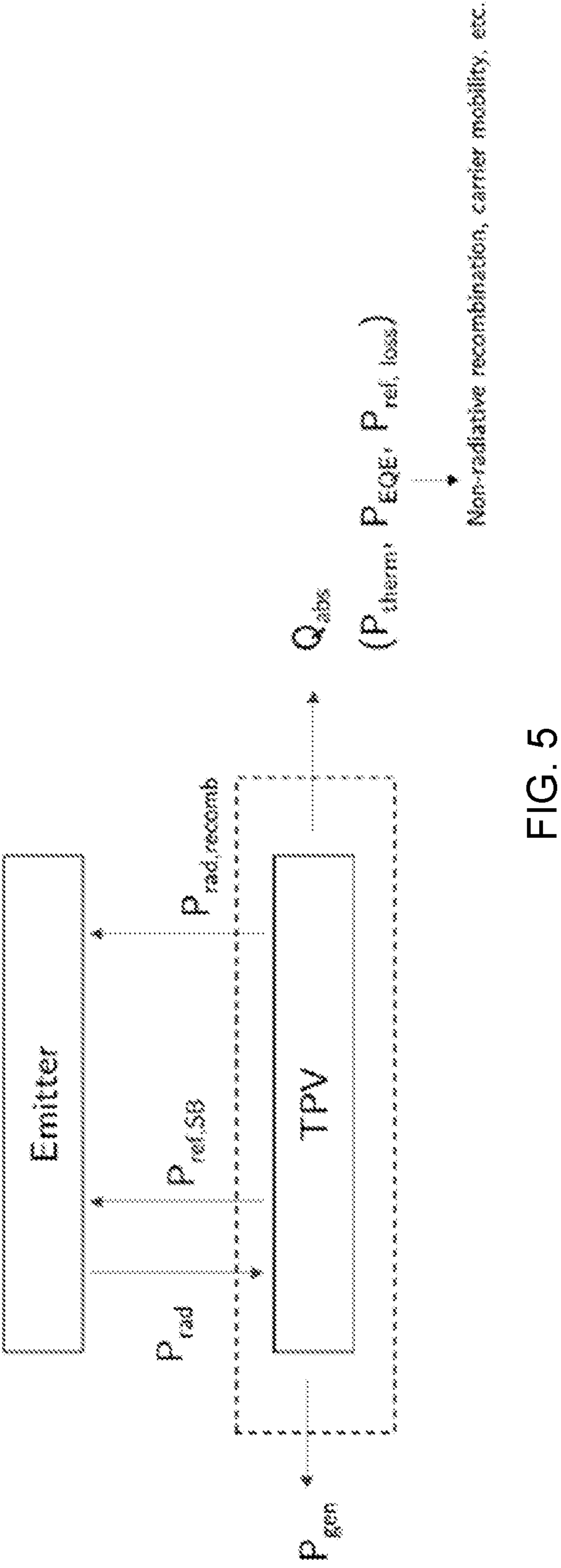
FIG. 5 is schematic of the power balance in a TPV system. Emitted power by the emitter is either reflected or absorbed. Once absorbed, excess energy above the bandgap is thermalized. At bandgap energy, charge carriers can radiatively recombine, and the resulting radiation can be sent back to the emitter to be reabsorbed. Alternatively, the charge carriers could non-radiatively recombine or face carrier mobility issues, reducing generated power.

Calculations for c-TPV efficiency based on either hydrogen or methane as fuel have been conducted. First, a power balance on the TPV system is considered to understand power and temperature requirements of the emitter surface. FIG. 5 shows a schematic of the power balance and the terms considered. Light is emitted in both sub- and above-bandgap wavelengths. Sub-bandgap light is mostly reflected and re-absorbed by the emitter, though some may be parasitically absorbed by the TPV cell or back-surface reflector.

Figure 6A:
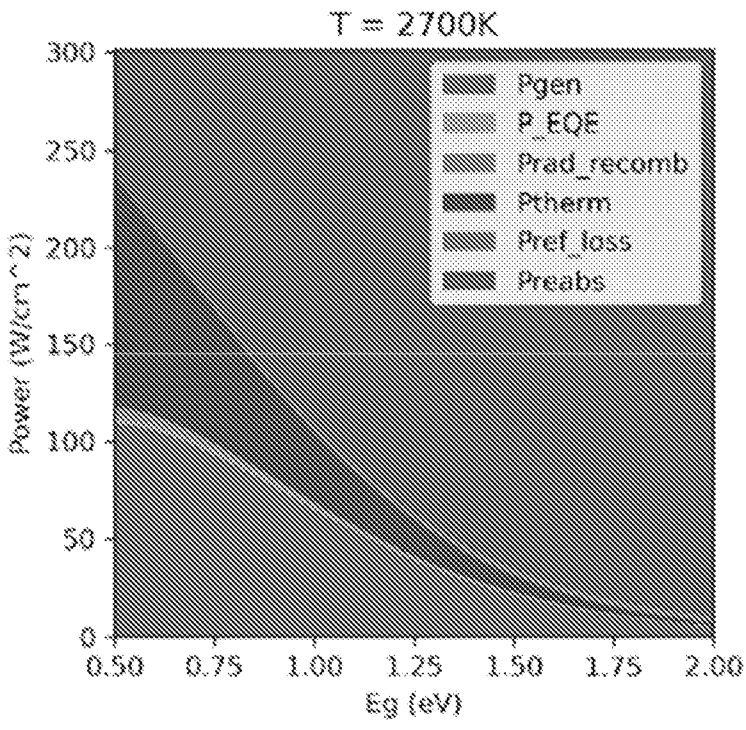
FIGS. 6A-6B shows stacked line plots of power distribution in the TPV system. Pgen indicates electricity generated from the PV cells. P_EQE indicates power losses due to nonradiative recombination and low carrier mobility. This was assumed to be constant at 98%. Prad recomb is the thermodynamic rate of radiative recombination. Ptherm is the thermalization losses due to photons in energy greater than the bandgap. Pref_loss is the power loss due to parasitic sub-bandgap absorption, assumed to be 99%. Preabs is the power reflected by the TPV cell and re-absorbed by the emitter.
Figure 6B:
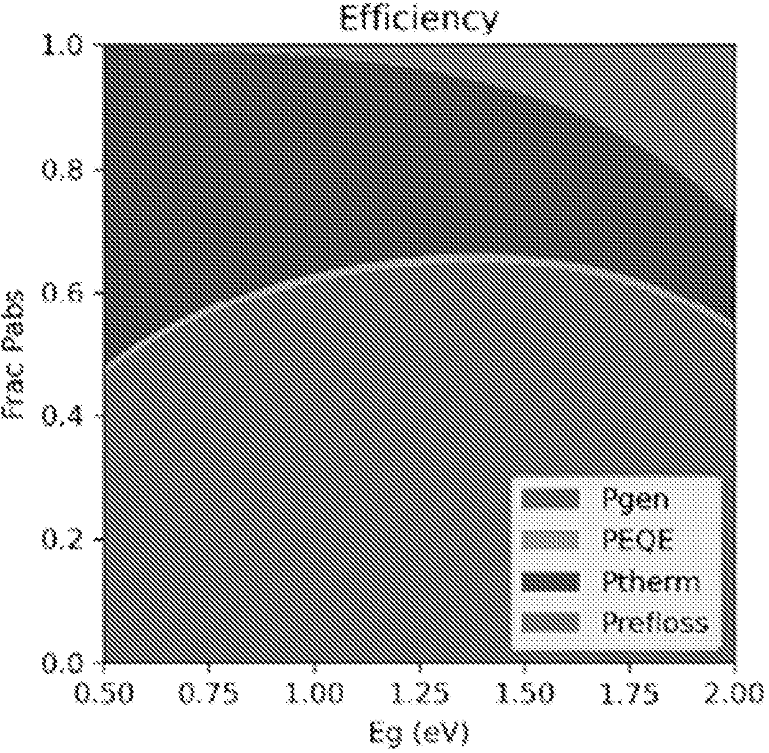

Above-bandgap light has several pathways. After photon absorption, excess energy in the photon above the bandgap is thermalized as heat. After thermalization, charge carriers are typically formed. Charge carriers could radiatively recombine, and the resulting photon could travel back to the emitter and be re-absorbed. Alternatively, through non-radiative recombination or due to low charge-carrier mobility, the electron-hole pair could fail to be extracted as current. If the charge-carrier is successfully extracted as current, this contributes to generated power. FIG. 6 shows the distribution of power for an emitter at 2700K.

As seen, the amount of net power, i.e., total power emitted minus power reflected from the TPV changes as a function of bandgap. Low bandgap TPV cells feature higher power density as more light is absorbed but have lower efficiency as they have greater thermalization losses. High bandgap TPV cells have low power density as they reflect more of the light and can also have low density if there are significant reflection losses. The ideal bandgap is predicted to be around 1.4 eV for a 2700K emitter, featuring a balance between thermalization and parasitic sub-bandgap absorption.

Figure 7A:
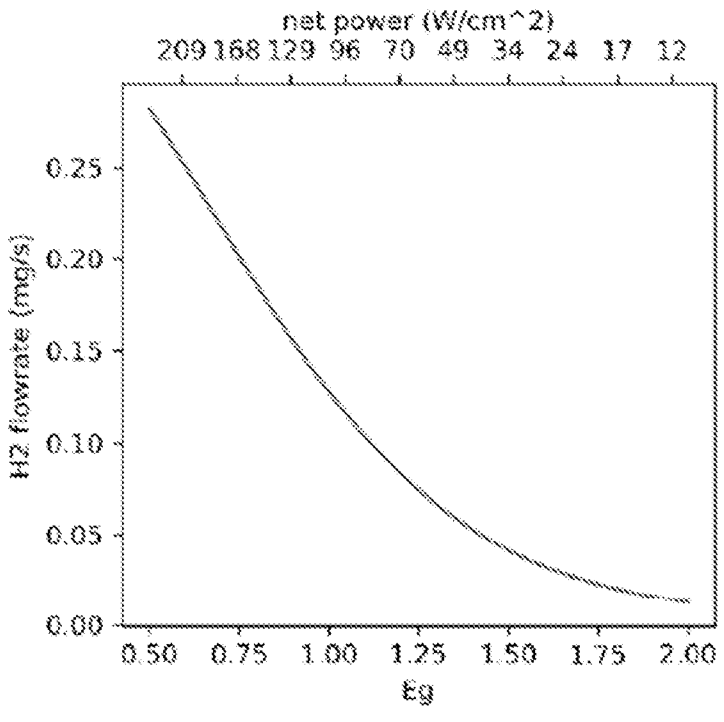
FIG. 7A is a graph depicting calculated required hydrogen flowrate as a function of bandgap and therefore net power, for a 2700K emitter, assuming zero heat transfer resistance between combustion products and the emitter wall.
Figure 7B:
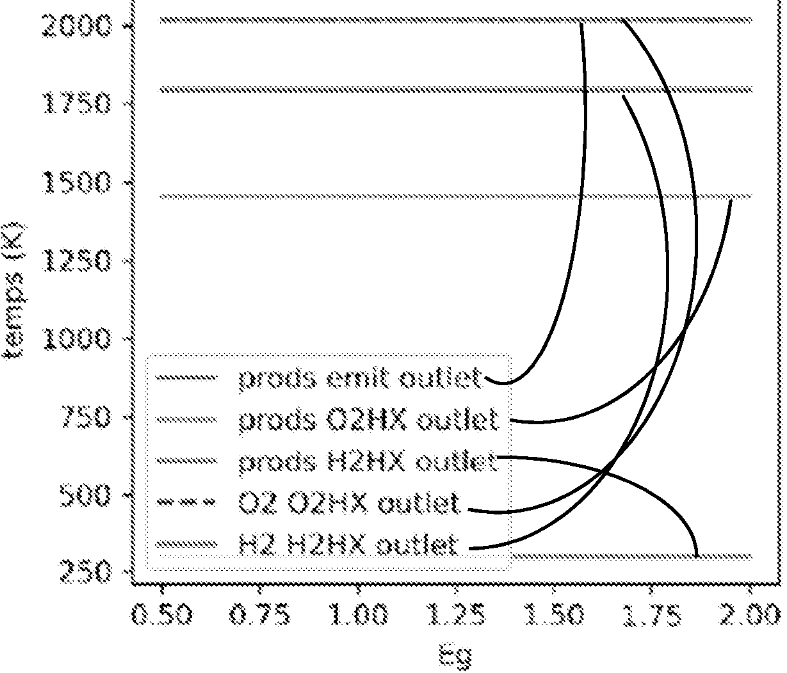
FIG. 7B is a graph depicting calculated temperatures at various parts of the combustor. The top line in FIG. 7B indicates temperatures of the combustion products at the combustor outlet. The lower line in FIG. 7B indicates exhaust temperature of the combustion products, i.e., after preheating the $O_2$ and $H_2$ in the recuperator. The dashed line in FIG. 7B indicates $O_2$ temperature after preheating with the combustion products. The second line from the top of FIG. 7B indicates $H_2$ temperature after preheating. The second line from the bottom of FIG. 7B indicates exhaust outlet temperature if only $O_2$ is preheated.

The flowrate of hydrogen required to provide this net power at the designated temperature can be calculated. The calculation can be based on the assumption that hydrogen burned stoichiometrically with oxygen. An emitter area of $10^{-5}$ $m^2$ was used. Based on these parameters, the flowrate required to keep the emitter temperature at 2700K can be calculated while simultaneously providing the net power required for each bandgap. One can assume there is no heat transfer resistance between the combustion gas and the emitter wall. The results are shown in FIG. 7A. As expected, higher net power requires higher hydrogen flowrate. However, the temperature profile for all cases is equivalent. The combustion products exit the combustor at around 2000K and are used to first preheat the oxygen fully. The remaining heat is used to preheat the hydrogen as much as possible. The exhaust leaves the recuperator at 300K. Therefore, all the heat of combustion either leaves through the emitter wall or is used to preheat the inlet $H_2/O_2$, resulting in a combustion efficiency of 100%. The efficiency of the entire c-TPV system is therefore equivalent to the TPV efficiency.

To show the diversity of the proposed design, in the following example, modeling for a combustor/recuperator with $CH_4$ is illustrated. Combustion of $CH_4$ in air with a recuperator for heat recovery was modeled using Engineering Equation Solver (EES) to size the system, then proceeded to compute the emitter temperature profile and net energy radiating from the emitter using COMSOL. Here, the heat transfer from the exhaust gas to the emitter wall was shown to have minimal impact on the efficiency. The modeled system consists of an individual combustor module which is ~30 cm in length, ~5 cm wide, and ~1 cm tall. The emitter is ~5 cm wide and ~1 cm tall. Most of the length is composed of the recuperator, with the combustion chamber and emitter at the end. The recuperator is composed of stacked plates with 1 mm channels made of $ZrO_2$. For the aforementioned dimensions, heat transfer coefficients were calculated at the required flow rates discussed below, and the recuperator had an effectiveness of 98%.

In COMSOL the gas flow, the heat transfer between the gas and the emitter, and the temperature-dependent net radiative heat flux leaving the emitter were simulates. An emitter emissivity of 0.7 for $ZrO_2$ (Ref. 10), the cell's emissivity weighted by the blackbody spectrum at the emitter temperature, a cell temperature of 300 K, AR=1 and a view factor VF=1 can be assumed.

Nominal air/fuel ratio of 110:1 where the mass flow rate of $CH_4$ is 2.84 mg/s and that of air is 312 mg/s was used. Ambient air enters the recuperator at 300K and is preheated to ~2050° C. by the exiting exhaust gas, which exits through another set of channels in an opposing plate (i.e., operating as a counterflow HX). At the end of the recuperator the air exits at ~2050° C., at which point it is mixed with fuel and combusts in the combustion chamber. The combustion at the air/fuel ratio raises the temperature of the exhaust gas to ~2350° C. and it transfers heat via convection to the walls of the emitter. The emitter HX shown here is a 2 mm wide channel with ~1 mm fins to increase the surface area to enhance the heat transfer. The exhaust gas then exists the emitter HX at ~2090° C. where it enters the recuperator and exchanges heat with the incoming air. Finally, the exhaust exits the recuperator at ~150° C.

Figure 8A:
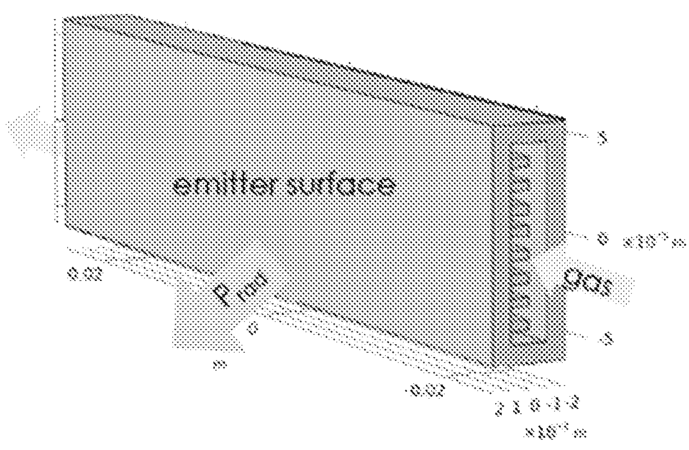
FIG. 8A is a schematic depicting a combustion chamber concept showing the gas flow and emitter wall.
Figure 8B:
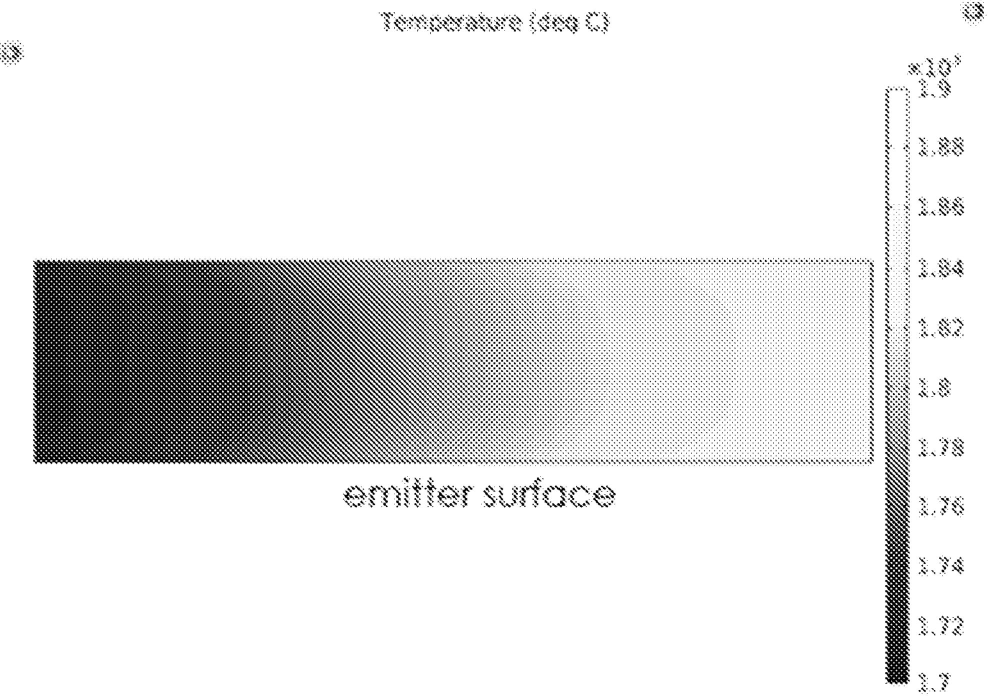
FIG. 8B is an image of a COMSOL model of the temperature profile of the emitter surface as the hot combusted gas flows across it. In this example in which $CH_4$ is combusted, an emitter surface temperature of 1700-1900° C. was reached.

From the COMSOL simulation, the exterior temperature of the emitter which is radiating to the TPV varies from ~1900° C. to ~1700° C. across its length. The net energy radiating to the TPV is 132 W. The LHV of the fuel at the aforementioned flow rate is 143 W. The pressure drop across the emitter HX is 2 kPa which causes a 4.3 W pumping power penalty at the exhaust gas flow rate. FIGS. 8A-8B. The total pressure drop across both the air and exhaust sides of the recuperator contributes to a pumping power penalty of 0.7 W leading to a total pumping power requirement of 5 W. With this rudimentary non-optimized design, the combustion efficiency $\eta_{combustion}$=(132 W−5 W)/143 W=89% accounting for pumping power requirements due to pressure drop. For a 1.2/1.0 eV tandem cell with a graybody emitter operating at the average emitter temperature of 1800° C., AR=1 and VF=1, the TPV efficiency $\eta_{TPV}$=34%. (Ref. 1) For a large system with minimal heat losses, this leads to an overall system efficiency $\eta_{TPV\ combustion\ system}=\eta_{combustion\ TPV}$=(0.89)*(0.3)=30%.

Figure 9A:
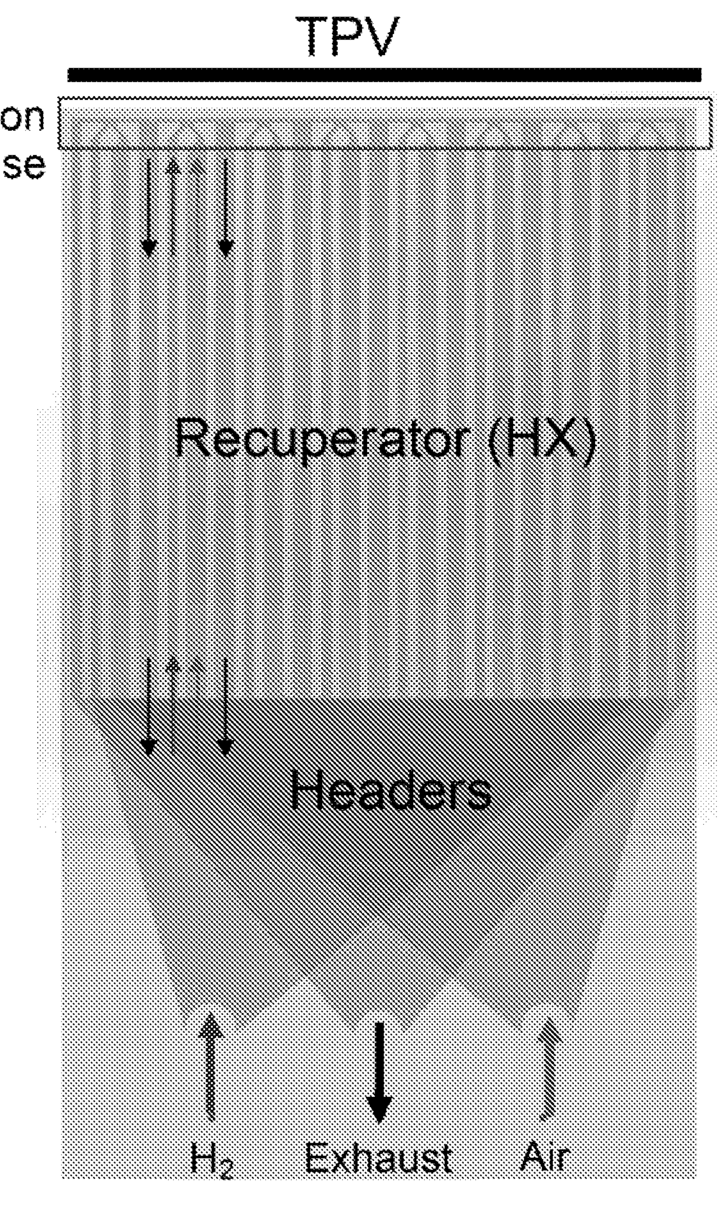
FIG. 9A is a schematic of a top-view of a combustor.
Figure 9B:
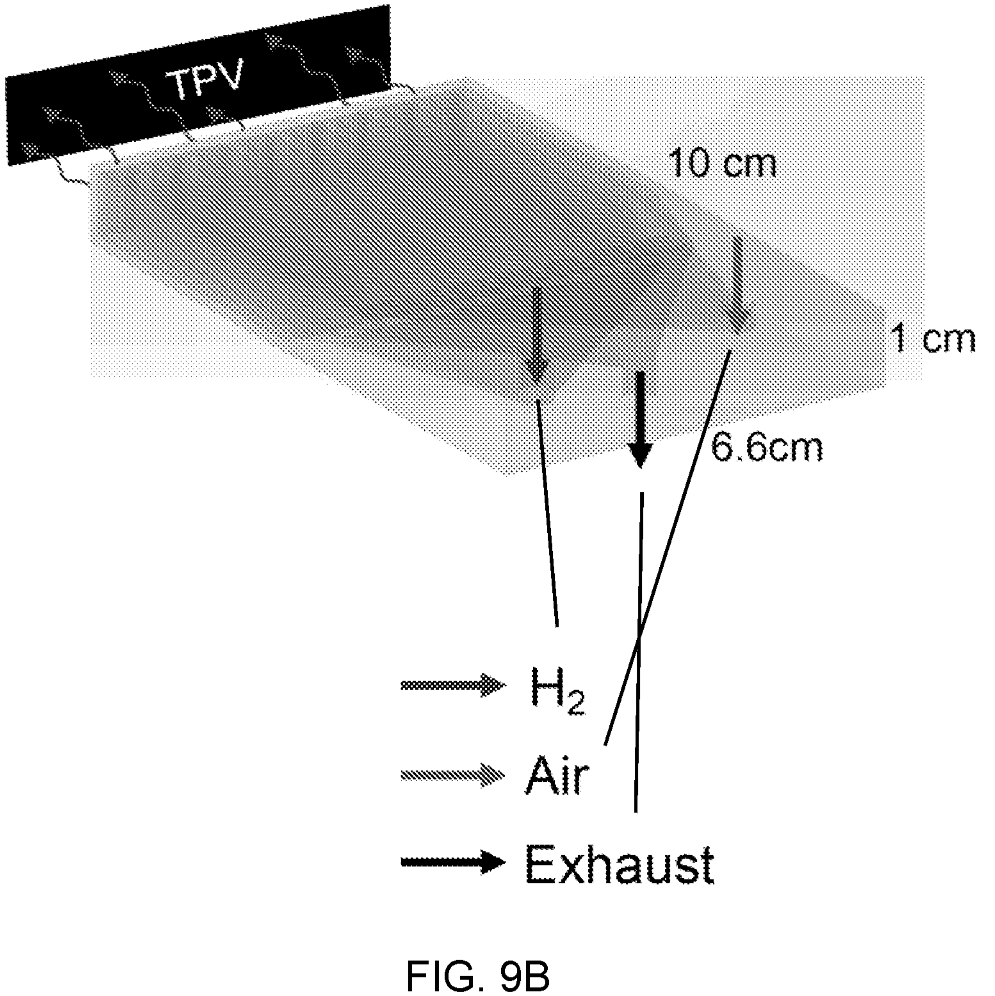
FIG. 9B is a schematic of a 3D view of a combustor showing gas flows, header and recuperator region, combustion zone, and TPV array.

The full design of the high-temperature ceramic combustor is shown in FIGS. 9A-9B. FIG. 9A shows the top view, with hydrogen and air inlets and exhaust outlet. The hydrogen and air are spread to the recuperator channels with headers. In the recuperator channels, the inlet gases are preheated above the autoignition temperature of the fuel. At the other end of the device, the gases mix and combust, releasing heat. The heat is then emitted towards the thermophotovoltaic array for electricity generation. FIG. 9B shows the 3D view of the combustor with dimensions.

Figure 10A:
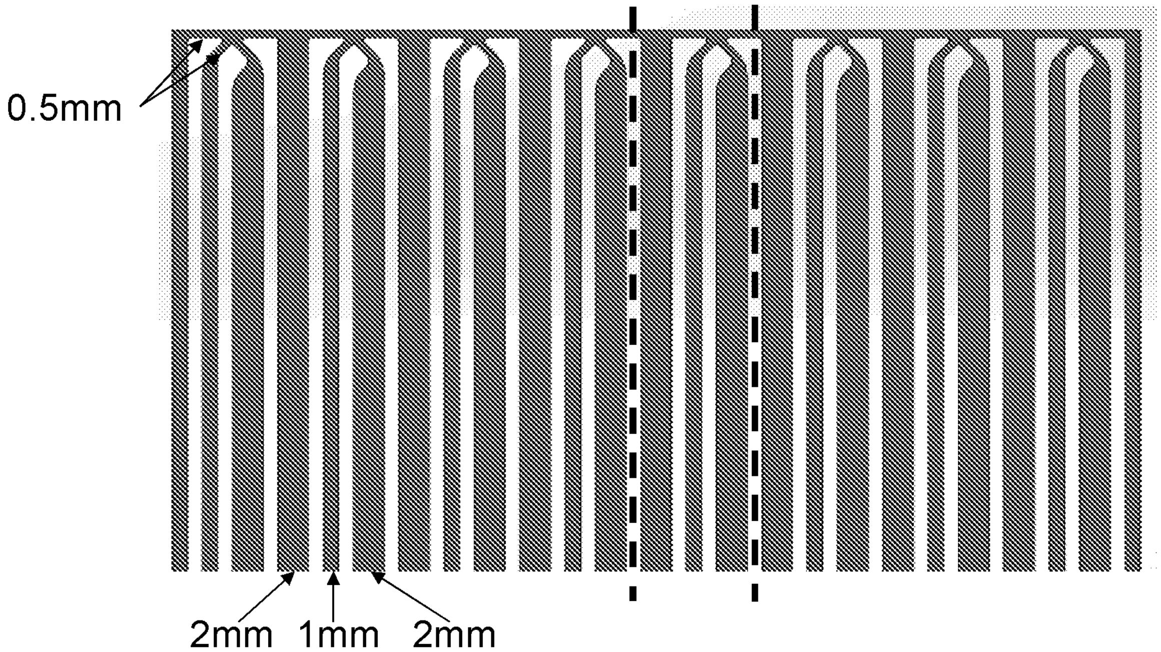
FIG. 10A is a top view of fluid channels of combustor showing modular nature of design.
Figure 10B:
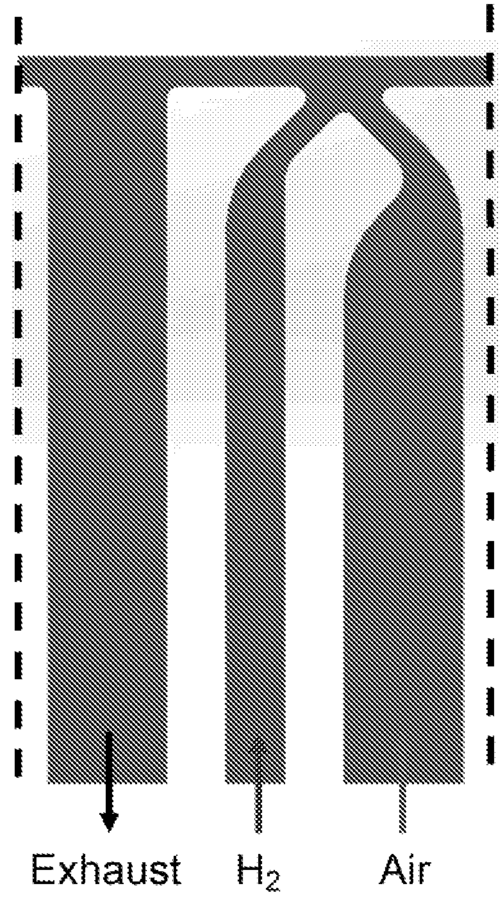
FIG. 10B shows a single unit cell of combustor with periodic boundary conditions applied.
Figure 10C:
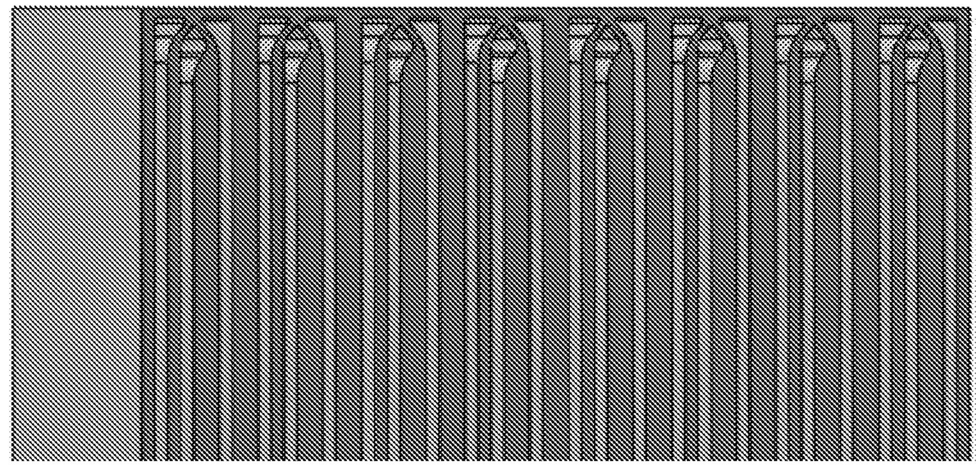
FIG. 10C shows a 3D view of fluid channels of combustor showing 2D design can be extruded.
Figure 11A:
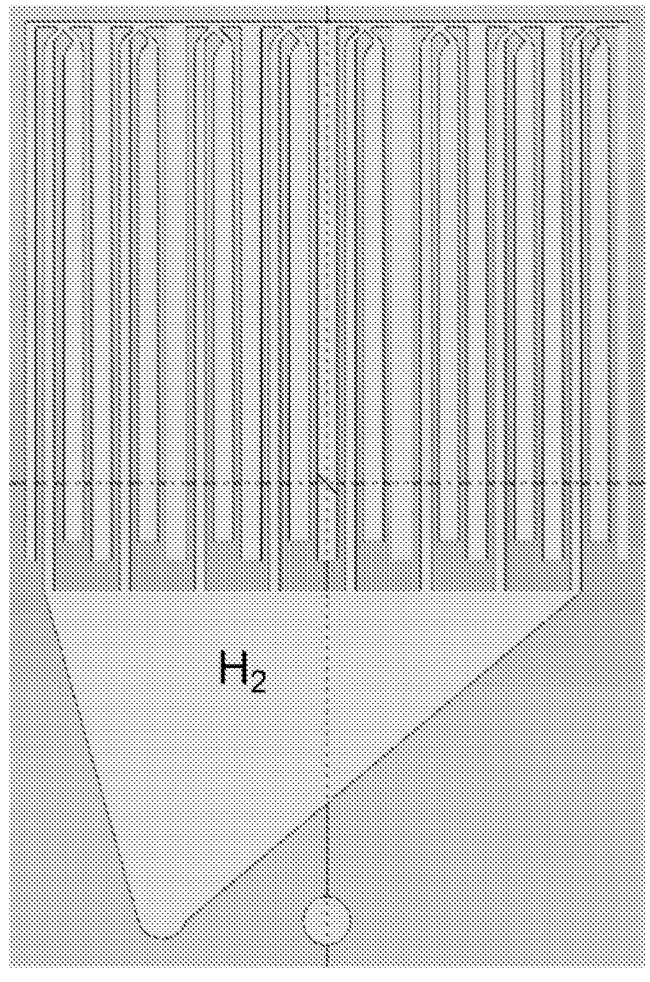
FIGS. 11A-11C depict schematics of horizontal headers for (FIG. 11A) hydrogen, (FIG. 11B) exhaust, and (FIG. 11C) air for flow distribution from inlet to recuperator channels.
Figure 11B:
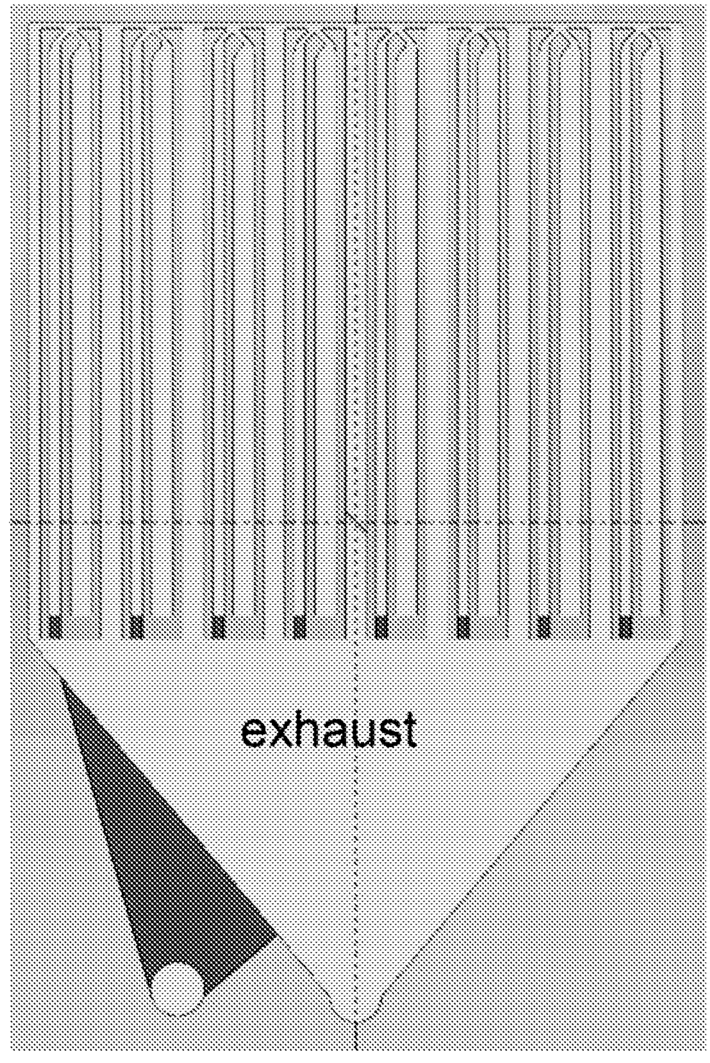
Figure 11C:
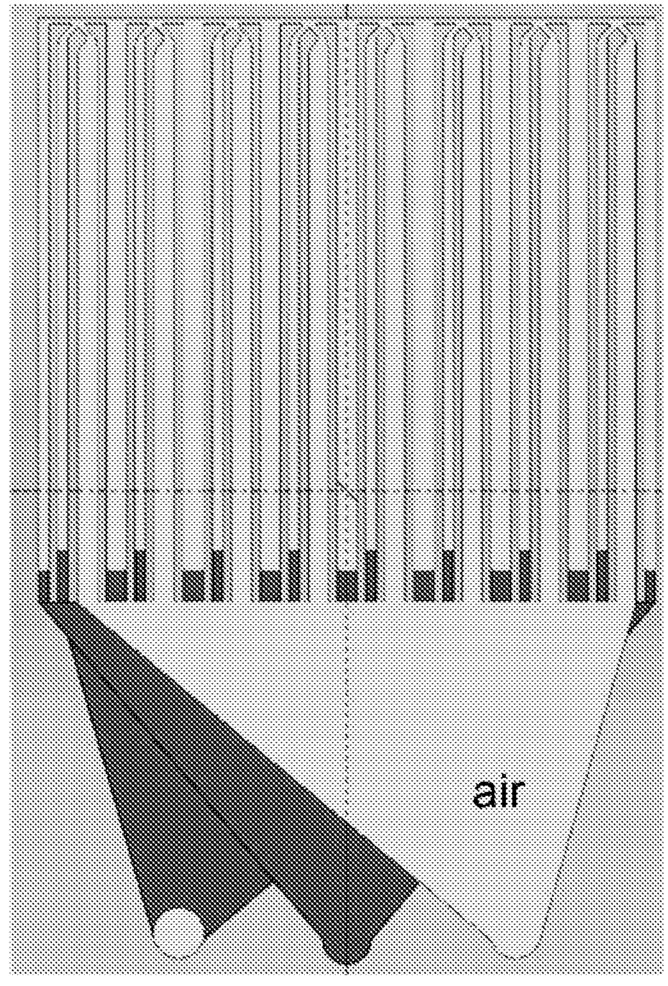
Figures 12A, 12B, 12C:
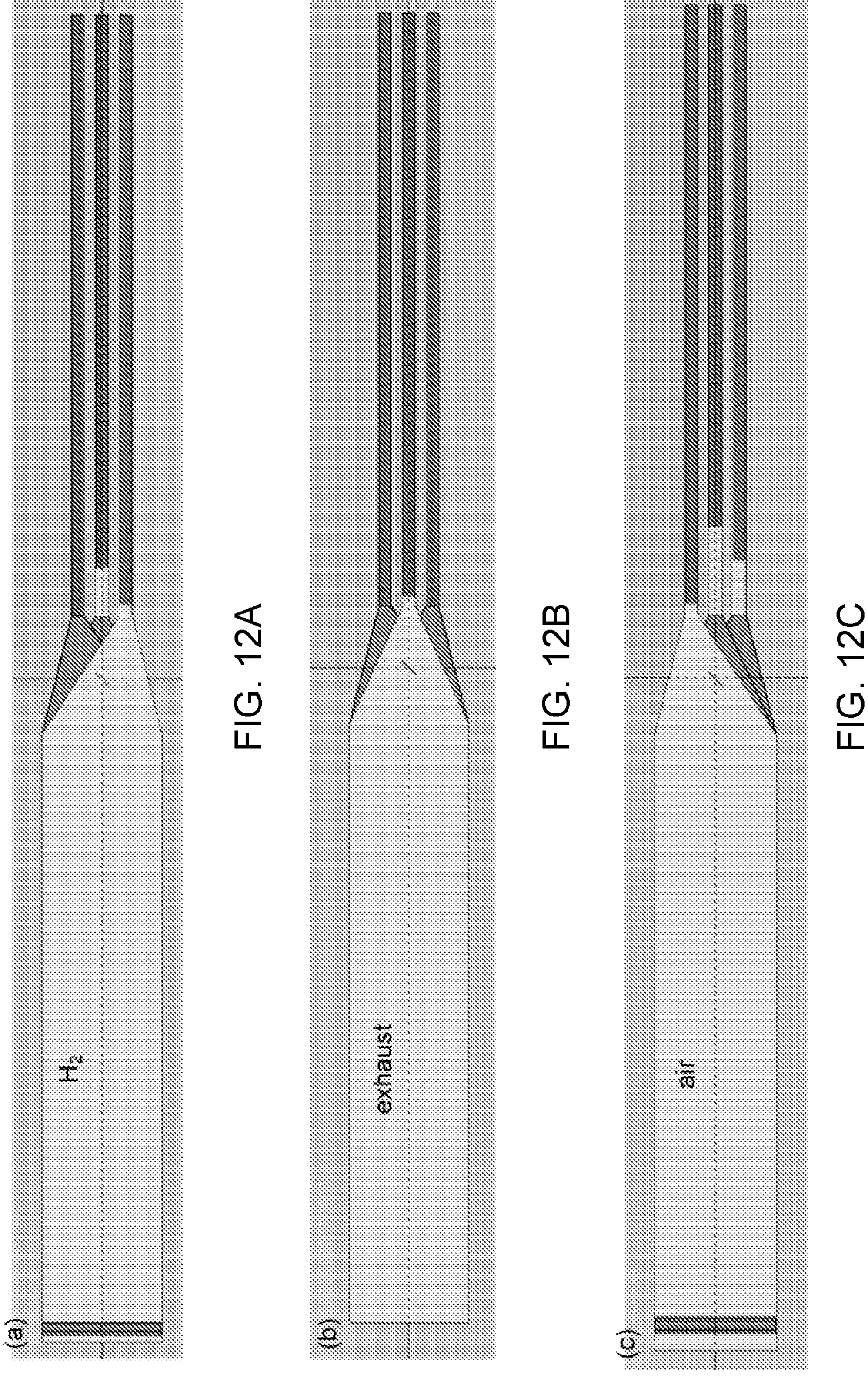
FIG. 12A-12C depict schematics of vertical headers for (FIG. 12A) hydrogen, (FIG. 12B) exhaust, and (FIG. 12C) air flow distribution from horizontal headers to full recuperator channel.

The design can be split into two distinct challenges: heat transfer and fluid flow. From a heat transfer standpoint, instead of modeling the entire combustor, shown in FIG. 10A, it can be simplified to the smallest unit cell, as shown in FIG. 10B. Using a 19-species 9-step chemical reaction mechanism, with hydrogen and air inlet at room temperature in stoichiometric ratios, gives a wall temperature of 2000° C. and exhaust temperature of 576° C. with a 10 cm long recuperator region. Calculating the ratio of heat output to input energy gives a combustion efficiency of 93% using the LHV of hydrogen and 80% using the HHV of hydrogen. Increasing the recuperator length to 50 cm increases the HHV efficiency to 93%.

There are many benefits to the modular nature of the design. Primarily, it can be scaled up easily by stacking multiple vertically or placing them horizontally. Further, there is low temperature variation between the highest and lowest temperatures along the wall, around 80° C. This ensures the TPV sees relatively constant temperature and therefore can be optimized to maximize efficiency and power density.

The second challenge is fluid flow, particularly how to distribute the inlet gases to the recuperator channels, and how to collect the exhaust gas to the outlet. Therefore, a header design involving inlets from the top of the device and an outlet at the bottom was developed. This configuration allows flanged connections to the combustor. Upon entry, the flow is distributed evenly to recuperator channels with the horizontal headers, shown in FIG. 11A and FIG. 11C. The flow is then spread vertically with additional headers, shown in FIG. 12A and FIG. 12C. The evenness of flow distribution is shown through fluid flow modeling. On exhaust, the flow is similarly collected through vertical and horizontal headers, shown in FIG. 11B and FIG. 12B.

Technoeconomic analysis predicts a power density of 150 W/kg and cost of 0.33 $/W at scale, including the costs of insulation.

The combustor may be manufactured with 3D printing of the entire ceramic part or sliced into sub-components which are in turn 3D printed or machined. In certain circumstances, the combustor material can be yttria (3 mol %) stabilized zirconia (3YSZ) due to its stability at high temperatures.

Reference numbers in parentheses "( )" herein refer to the corresponding literature listed in the attached Bibliography which forms a part of this Specification, and the literature listed below is incorporated by reference in its entirety.

(1) LaPotin, A. et al. Thermophotovoltaic Efficiency of 40%. *Nature* 2022, In Press.

(2) Ganapati, V. et al. Ultra-efficient thermophotovoltaics exploiting spectral filtering by the photovoltaic band-edge. *arXiv preprint arXiv:* 1611.03544 2016.

(3) Omair, Z. et al. Ultraefficient thermophotovoltaic power conversion by band-edge spectral filtering. *Proceedings of the National Academy of Sciences* 2019, 116, 15356-15361.

(4) Narayan, T. C. et al. In *Tilte,* 15 June-21 Aug. 2020, 2020.

(5) Fan, D. et al. Near-perfect photon utilization in an air-bridge thermophotovoltaic cell. *Nature* 2020, 586, 237-241.

(6) Amy, C.; Seyf, H. R.; Steiner, M. A.; Friedman, D. J.; Henry, A. Thermal energy grid storage using multi-junction photovoltaics. *Energy & Environmental Science* 2019, 12, 334-343.

(7) Seyf, H. R.; Henry, A. Thermophotovoltaics: a potential pathway to high efficiency concentrated solar power. *Energy & Environmental Science* 2016, 9, 2654-2665.

(8) Scheithauer, U. et al. Additive Manufacturing of Ceramic Heat Exchanger: Opportunities and Limits of the Lithography-Based Ceramic Manufacturing (LCM). *Journal of Materials Engineering and Performance* 2018, 27, 14-20.

(9) Huang, C. et al. Review on the characteristics of flow and heat transfer in printed circuit heat exchangers. *Applied Thermal Engineering* 2019, 153, 190-205.

(10) Wade, W. R. Measurements of Total Hemispherical Emissivity of Several Stably Oxidized Metals and Some Refractory Oxide Coatings. 1959.

It should be understood that the subject matter defined in the appended claims is not necessarily limited to the specific implementations described above. The specific implementations described above are disclosed as examples only.

What is claimed is:

1. A device for electricity generation, comprising a combustor/recuperator system comprising a recuperator, a combustor, and an emitter; wherein the recuperator comprises an intake for air and fuel, wherein the combustor burns fuels, transfers exhaust gases to the recuperator to preheat the air and fuel, and transfers heat of combustion to the emitter; and wherein the emitter radiates heat generated by the combustor; and a thermophotovoltaic adjacent to the emitter;

wherein the combustor/recuperator system comprises a stacked array of individual combustor/recuperator modules, wherein top, bottom, and side boundaries of each individual combustor/recuperator module are adiabatic; and wherein the stacked array comprises an emitter surface that emits heat towards the thermophotovoltaic.

2. The device of claim 1, wherein the thermophotovoltaic comprises a thermophotovoltaic array.

3. The device of claim 1, wherein the fuel comprises $H_2$ or $CH_4$.

4. The device of claim 1, wherein the combustor/recuperator system comprises yttria-stabilized zirconia (YSZ).

5. The device of claim 1, wherein the combustor comprises a fuel inlet and an air inlet.

6. The device of claim 1, wherein the combustor comprises channels made by additive manufacturing.

7. The device of claim 1, wherein the combustor comprises a ceramic channel.

8. The device of claim 1, wherein the recuperator is made by additive manufacturing.

9. The device of claim 5, wherein the fuel inlet and the air inlet of the combustor are above the autoignition temperature of the fuel.

10. The device of claim 1, wherein the fuel and the air enter the recuperator at 300° K and are preheated to 2000° C. or greater by exiting exhaust gas.

11. The device of claim 1, wherein at the end of the recuperator the fuel and the air exit at greater than 2000° C. and combust in the combustor.

12. The device of claim 1, wherein combustion of the fuel and the air in the combustor raises the temperature of the exhaust gas to greater than 2000° C. and transfers heat via convection to the walls of the emitter.

13. The device of claim 1, wherein exterior temperatures of the emitter radiating to the thermophotovoltaic vary from about 1900° C. to about 1700° C. across its length.

14. The device of claim 1, wherein heat of combustion is transferred from the combustor to the emitter to the thermophotovoltaic and the remaining heat is recuperated.

15. The device of claim 1, wherein the thermophotovoltaic absorbs the incident radiation produced by the emitter as heat or electricity or reflects the incident radiation back to the emitter.

* * * * *